Figure 1:
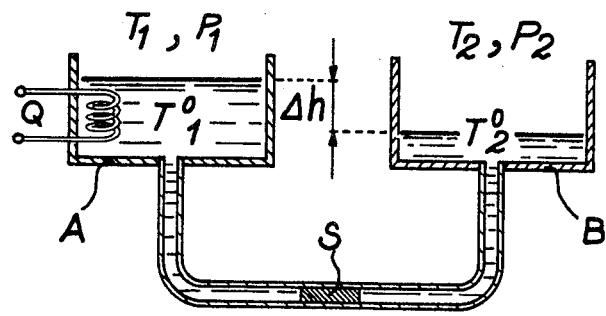

United States Patent [19]
Bon Mardion et al.

[11] Patent Number: 4,485,640
[45] Date of Patent: Dec. 4, 1984

[54] DEVICE FOR AUTOMATICALLY REGULATING THE SUPERFLUID HELIUM LEVEL IN A TANK

[75] Inventors: Gilbert Bon Mardion, Eybens; Gérard Claudet, Grenoble; Marcel Locatelli, Saint Ismier, all of France

[73] Assignee: Commissariat a l'Energie Atomique, Paris, France

[21] Appl. No.: 481,272

[22] Filed: Apr. 1, 1983

[30] Foreign Application Priority Data

Apr. 1, 1982 [FR] France .................. 82 05644

[51] Int. Cl.³ .............................................. F25B 19/00
[52] U.S. Cl. ...................................... 62/514 R; 62/49
[58] Field of Search ............................ 62/514 R, 49

[56] References Cited
U.S. PATENT DOCUMENTS

| | | | |
|---|---|---|---|
| 3,195,322 | 7/1965 | London | 62/514 R |
| 3,447,333 | 7/1969 | Goodstein | 62/514 R |
| 3,581,512 | 6/1971 | Staas et al. | 62/514 R |
| 3,589,138 | 6/1971 | Severijns et al. | 62/514 R |
| 4,002,039 | 1/1977 | Cramer et al. | 62/514 JT |

Primary Examiner—Ronald C. Capossela
Attorney, Agent, or Firm—Michael N. Meller

[57] ABSTRACT

The device comprises in the tank above the liquid:
a pipe for supplying the tank with superfluid helium;
a member for removing the superfluid helium by spontaneously producing on its surface a so-called Rollin film, which is essentially located at the horizontal level to which it is desired to regulate the free surface of the helium in the tank and whereof the removing perimeter, which is a variable as a function of the altitude, increases over a height equal to the tolerance in the evolution of the level from its base to a maximum value at its upper junction point with a superleak associated therewith and which is then traversed by the thus removed superfluid helium;
a heated chamber into which issues the superleak and which is linked, on the one hand, with an outlet having a controlled flow rate to the atmosphere of the tank and, on the other hand, to a chamber having flexible deformable walls and a variable volume, said walls causing, during their extension or retraction, the displacement of a rod, whose position is consequently characteristic of the helium level in the tank;
means for making the entry of helium in the tank supply pipe dependent on the position of the rod.

3 Claims, 2 Drawing Figures

DEVICE FOR AUTOMATICALLY REGULATING THE SUPERFLUID HELIUM LEVEL IN A TANK

BACKGROUND OF THE INVENTION

Supplying in constant level form a reservoir or tank containing a random liquid, which is liable to flow out or evaporate, makes it necessary to carry out various operations involving the detection of the level, the interpretation of the signal obtained and then, on the basis of this, acting on the flow rate at which the liquid enters the tank.

When the liquid is helium, whose boiling temperature, which is a function of the vapor pressure, can be in the range 1 to 5 degrees absolute, one of the essential conditions to be satisfied is to limit to the maximum heat passing onto the bath to be checked.

The means generally used for measuring the helium level are either capacitive or superconductive probes giving a continuous measurement, or resistance point probes giving an "all or nothing" signal.

The generally electrical signal is collected and processed by electronic means operating at ambient temperature, where they actuate the electrical or pneumatic control of a regulating valve, whose cold active element (seat and needle) controls the necessary supply flow rate.

In the special case where the helium is in the superfluid state, at temperatures below $T\lambda = 2.17°$ K., very special properties appear and these can be utilized for permitting either the detection of a liquid - gas interface, or the checking of its position. These very curious properties are linked with the existence of a helium isomer, namely helium II, which only appears below $T\lambda$ and which more particularly gives rise to the absence of a triple point of the helium, whose vapor tension and fusion curves do not meet.

Among the usable properties which only appear in the superfluid liquid phase of helium are the Fontaine pressure effect and the so-called Rollin film phenomenon. Brief details are given of these below in order to facilitate the understanding of the device according to the invention.

I. The Fontaine Pressure Effect

FIG. 1 represents the state of the art and the tanks A and B containing superfluid helium are connected by means of a "superleak", S. The latter is generally produced by compressing within a tube a pulverulent material with a small grain size and has a porosity such that a standard fluid such as normal helium is unable to circulate, whereas the superfluid helium phase, whose apparent viscosity is zero, can flow freely.

Under these conditions, heat Q is supplied to tank A in such a way that temperature T1 is kept at a value higher than T2 of the other tank B, so that a level difference $\Delta h$ appears and represents the existence of a difference between pressures $P_1$ and $P_2$ at the bottom of each tank:

$$T_1 > T_2 \longrightarrow P_1 > P_2$$

If the temperature is below $T\mu = 2.17°$ K., the pressure differential which it can be expected to reach in the ideal case is written:

$$\Delta P = \int_{T2}^{T1} 23 \cdot T^{6.6} \, dT \text{ for } 1.3° \text{ K.} < T < T_\lambda$$

This effect is known as the Fontaine effect.

In the case of temperature variations of a few tenths of a degree, pressures of a few hundred Torr can easily be obtained. For information, it should be noted that for the same temperature variations, the pressure differential of saturated steam is only a few Torr.

II. The Rollin Film

Liquid helium in the superfluid state, which maintains a non-zero surface tension, whilst its viscosity is zero, is able to perfectly wet the walls of tanks and may possibly rise on an isothermal wall.

As a first approximation, the flow rate which can be transferred by this film is proportional to the wetted perimeter with, as an order of magnitude, approximately $T = 1.8°$ K. flow rate values of approximately $5 \cdot 10^{-5}$ cm$^3$/s/cm.

SUMMARY OF THE INVENTION

The present invention relates to a device for automatically regulating the superfluid helium level in a tank, which utilizes the special known properties, referred to hereinbefore, of superfluid helium, i.e. the Fontaine pressure effect and the Rollin film effect.

Thus, the present invention specifically relates to an automatic regulating device, wherein it comprises in the tank above the liquid:

a pipe for supplying the tank with superfluid helium;

a member for removing the superfluid helium by spontaneously producing on its surface a so-called Rollin film, which is essentially located at the horizontal level to which it is desired to regulate the free surface of the helium in the tank and whereof the removing perimeter, which is a variable as a function of the altitude, increases over a height equal to the tolerance in the evolution of the level from its base to a maximum value at its upper junction point with a superleak associated therewith and which is then traversed by the thus removed superfluid helium;

a heated chamber into which issues the superleak and which is linked, on the one hand, with an outlet having a controlled flow rate to the atmosphere of the tank and, on the other hand, to a chamber having flexible deformable walls and a variable volume, said walls causing, during their extension or retraction, the displacement of a rod, whose position is consequently characteristic of the helium level in the tank;

means for making the entry of helium in the tank supply pipe dependent on the position of the rod.

According to the invention, the removal of liquid helium in the superfluid state from its tank takes place on the liquid—gas separation surface by using a removal or sampling member, which is partly submerged in the liquid and along which is formed a Rollin film. Due to the fact that, according to the invention, the removal or sampling surface of said member is variable as a function of the altitude makes it possible to increase removal as a function of the increased height of the separation level between the liquid phase and the gaseous phase.

The superleak following this removal member makes it possible, by using the calories supplied by a heating resistor into the associated chamber, to produce an overpressure in this chamber by the Fontaine effect and use is made of the latter for bringing about a limited swelling of the chamber having elastic, deformable walls and for displacing a rod connected to these walls. Analogously, this displacement represents superfluid helium surface altitude variations.

Making the flow rate at which superfluid liquid helium enters the supply pipe of the tank dependent on the position of the rod can be brought about by any known means. According to an original feature of the invention, the tank supply pipe has an inlet valve, whose rod directly forms the needle. In this way, as the needle has displacements precisely representing those of the liquid helium—gaseous helium separation surface which it is wished to regulate, it is merely necessary to regulate said valve to ensure that its closing takes place when the superfluid helium level in the tank reaches the desired regulation altitude.

The chamber into which the superleak issues can be heated by any known means and in particular by an electrical resistor. However, it is also possible to use any other heating process, such as thermal conduction or radiation from higher temperature areas, together with e.g. a heat exchange with the helium entering the tank supply pipe. The only condition to be respected is that said chamber is supplied with an adequate quantity of calories to ensure that the Fontaine pressure produced by the temperature difference between the tank and the chamber is adequate to ensure the swelling of the deformably walled chamber and the displacement of the intake-regulating rod.

DESCRIPTION OF THE DRAWING AND PREFERRED EMBODIMENTS

Figure 2:
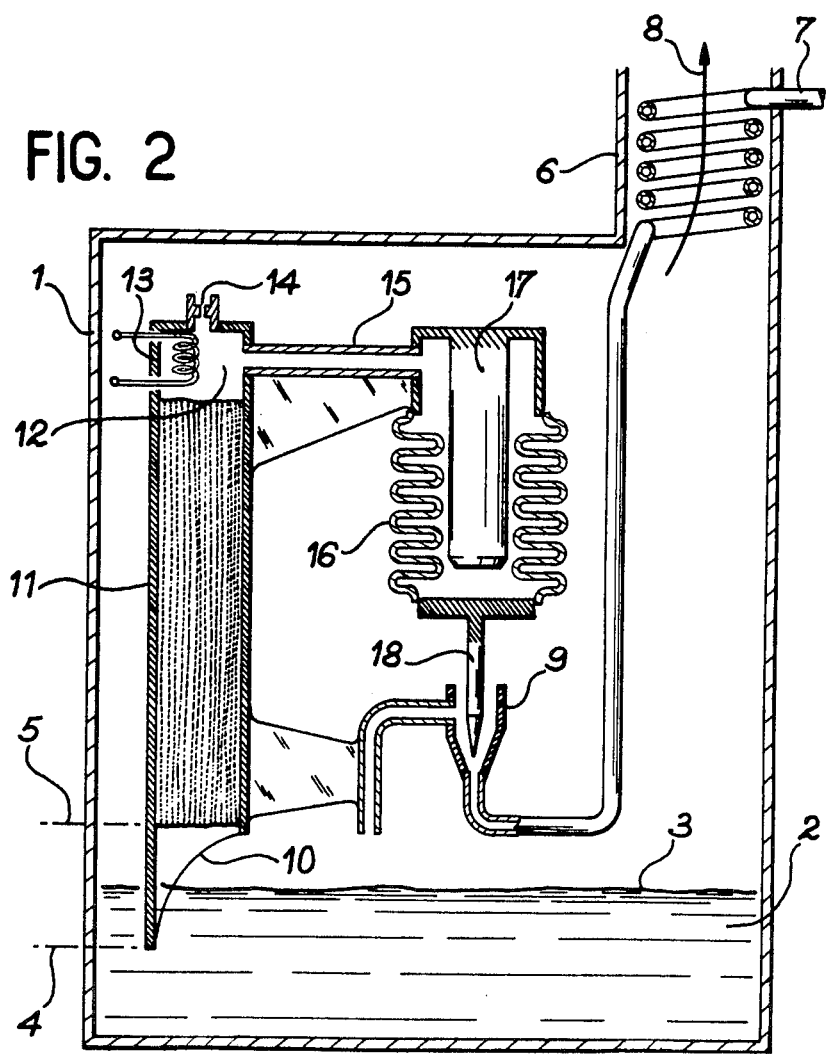

The invention will be better understood from referring to the following description of a non-limitative embodiment and the attached FIG. 2, which is adiagrammatic section of a tank containing superfluid helium.

FIG. 2 shows tank 1, which contains superfluid liquid helium 2, whose separation surface 3 with the upper gaseous phase must automatically be maintained between certain defined limits 4 and 5. Tank 1 is obviously linked by duct 6 with pumping means adapted to obtaining desired pressures and temperatures. A supply pipe 7 issues into duct 6 of tank 1, firstly in the form of a coil permitting an exchange of calories with the cold vapors escaping from the tank in the direction of arrow 8, after which said pipe descends into the vicinity of surface 3, whilst passing through an intake valve 9.

The tank is supplied with fluid by pipe 7 and said fluid can either be liquid helium, or gaseous helium at pressures and temperatures such that, after expansion in valve 9, the helium is converted into its superfluid form.

According to the invention, a superfluid helium sampling or removal member is provided between level 4 and level 5 and has a variable removal surface from the zero value at level 4 to its maximum value at level 5.

The removal member 10, which has a variable cross-section, can be produced in various ways and reference can be made e.g. to flared tubes, plates, wires, or fritted rods. The essence is that the perimeter in contact with the superfluid helium 2 is variable as a result of a regular increase from level 4 to level 5. As soon as level 4 is reached by the superfluid helium surface 3, a Rollin film is produced, which rises along the removal member 10. The thus sampled helium flow progressively increases when the level of liquid 3 rises to reach its maximum value, when liquid 5 is itself reached by the separation surface 3.

According to the invention, the removal member 10 is associated with a superleak 11 constituted by a duct in which is placed a pulverulent material having a small grain size.

In turn, this superleak 11 issues into a heated chamber 12, which is symbolized in FIG. 2 by the presence of an electrical resistor 13 therein. However, as explained hereinbefore, it is obvious that any other equivalent heating means can be used without passing beyond the scope of the invention. Chamber 12 is linked with a controlled flow outlet 14 and by pipe 15 with a chamber 16 having flexible, elastic, deformable walls and a variable volume, whose bellows-like walls can be displaced in translation along a vertical guide core 17. The end of the bellows-like deformable walls of chamber 16 is connected to metal rod 18 which, in the embodiment of FIG. 2, constitutes the needle of valve 9.

The device according to FIG. 2 functions as follows. The superfluid helium flow removed by the removal member 10 traverses superleak 11 and enters chamber 12 where the Fontaine effect, due to the heating by resistors 13, develops a pressure which is imparted to chamber 16 which, by expanding, leads to the displacement of metal rod 18. Outlet 14, whose size is regulated to a predetermined value guarantees the existence of a maximum gaseous pressure in chamber 12. When the superfluid helium level 3 drops below level 4 no more helium is removed and there is no pressurized helium in chamber 12. Outlet 14 makes it possible to dicharge all the pressure which may be present in chambers 12 and 16. Rod 18 retracts to the maximum by rising towards the top of tank 1, thus freeing the opening of valve 9, which permits the introduction of a further quantity of helium and the raising of level 3. In other words, rod 18 and level 3 are vertically displaced at all times in opposite directions.

However, when level 3 reaches level 5, the superfluid helium quantity removed from the system is at a maximum and consequently so is the pressure in chambers 12 and 16. This leads to a maximum lowering of rod 18, which closes valve 9, thus bringing about the stoppage of helium entry.

The supply of heat Q, indicated at 13, to chamber 12 can be obtained by different means, such as electrical heating, thermal radiation or solid conduction from areas having higher temperatures. It can also be realized by heat exchange with the fluid penetrating at 7 and by supplying valve 9, provided that said fluid is at an appropriate temperature.

The cold vapors 8 escaping from tank 1 may or may not exchange heat with the supply fluid introduced at 7.

Finally, instead of directly using needle 18 for regulating the entering liquid flow rate, it may be sufficient to merely measure its displacement by a random means and interpret the collected signal in order to provide e.g. a level measuring probe.

What is claimed is:

1. A device for automatically regulating the level of helium in the superfluid state in a tank, wherein it comprises in the tank above the liquid:
   a pipe for supplying the tank with superfluid helium;
   a member for removing the superfluid helium by spontaneously producing on its surface a so-called Rollin film, which is essentially located at the horizontal level to which it is desired to regulate the free surface of the helium in the tank and whereof the removing perimeter, which is a variable as a function of the altitude, increases over a height equal to the tolerance in the evolution of the level from its base to maximum value at its upper junction point with a superleak associated therewith and which is then traversed by the thus removed superfluid helium;

a heated chamber into which issues the superleak and which is linked, on the one hand, with an outlet having a controlled flow rate to the atmosphere of the tank and, on the other hand, to a chamber having flexible deformable walls and a variable volume, said walls causing, during their extension or retraction, the displacement of a rod, whose position is consequently characteristic of the helium level in the tank;

means for making the entry of helium in the tank supply pipe dependent on the position of the rod.

2. A regulating device according to claim 1, wherein the metal rod constitutes the needle of an intake valve positioned on the supply pipe for the tank.

3. A regulating device according to claim 1, wherein the heating of the chamber, into which issues the superleak, is regulated to a level such that the Fontaine pressure produced is adequate to ensure the translation of the rod.

* * * * *